Figure 1:
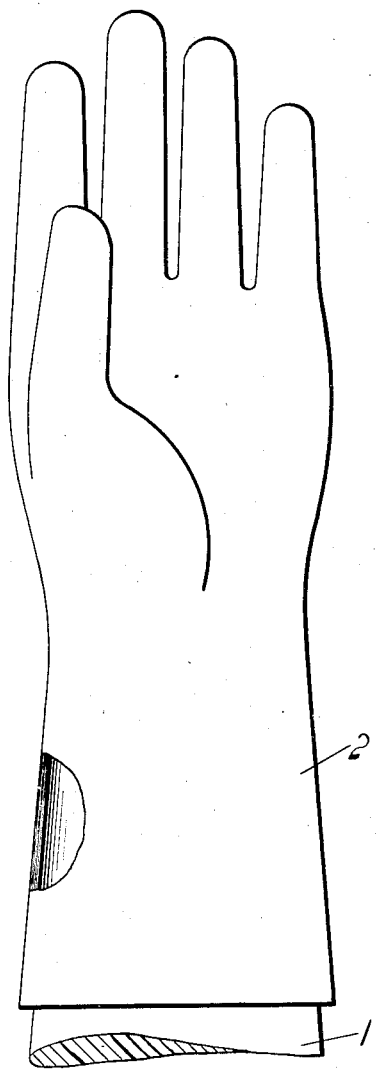

Oct. 25, 1927.

T. G. RICHARDS 1,647,055

METHOD OF MANUFACTURING LAMINATED ARTICLES

Original Filed Jan. 7, 1925

INVENTOR.
Thomas G. Richards.
BY
ATTORNEY.

Patented Oct. 25, 1927.

1,647,055

UNITED STATES PATENT OFFICE.

THOMAS G. RICHARDS, OF BARBERTON, OHIO.

METHOD OF MANUFACTURING LAMINATED ARTICLES.

Original application filed January 7, 1925, Serial No. 1,099. Divided and this application filed December 4, 1925. Serial No. 73,156.

The use of X-ray machines is attended with injurious effects upon the operators, or those whose work requires attendance on or near the machines, the rays being dangerous to human organisms, as is well known to those familiar with their use.

It is the purpose of the present invention to provide a material which, when worn, will serve to protect the operators from the injurious effects of the rays, and for this purpose I propose to use metallic lead, one of the properties of which is that it intercepts the X-rays. Other substances than metallic lead may be used provided that the X-ray intercepting properties are present therein.

In the drawings herein, there is shown one form of the invention, and for the purpose of illustration I have shown and described the manufacture of a glove, but it will be understood that the invention may be practised in the manufacture of other articles of wearing apparel, such as aprons, coats, or the like. Other changes and modifications may be made in the practising of the invention.

The new article of manufacture constructed by the method disclosed herein is covered in my copending application Serial No. 1,099, filed January 7, 1925, of which this application is a division.

Figure 2:
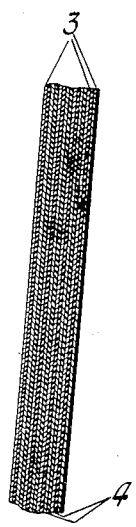

In the drawing:

Figure 1 shows a glove upon a form and constructed in accordance with the invention; and Figure 2 is a fragmentary cross-section of the finished product upon a magnified scale, showing the construction of the several layers which constitute the laminated structure.

In describing the invention I have shown a seamless rubber glove which is manufactured upon a form such as shown at 1. This is made of glass or porcelain and is dipped in a solution of rubber a sufficient number of times to build up a glove 2 of the proper thickness. After each dipping, and while the layers of rubber are in a tacky condition, a fine coating of powdered metallic lead is sprinkled over and adheres to the rubber. The dipping and sprinkling processes are repeated until the desired thickness of the meaterial is built up. The glove is then vulcanized in the usual manner.

The structure of the article is illustrated in Figure 2, in which the successive layers of rubber are indicated by the numeral 3 and the intervening layers by the numeral 4.

The glove constructed in the manner described has been found to possess the property of protecting the operator from the injurious effects of the rays, and so far as known to me is the first practical construction for the uses and purposes set forth. The lead is impermeable to X-rays and the articles are flexible and can be used in the same manner as the ordinary rubber glove.

In constructing other articles of wearing apparel, the method of forming the layers of rubber may be varied as dictated by the character of the article to be manufactured, and I do not intend to be limited to the particular method or to the specific articles herein shown and described.

What is claimed is:

1. The method of manufacturing a protective garment for use by X-ray operators comprising dipping a form in a solution of rubber, partially drying the skin of rubber thereby obtained, and while the same is in tacky condition sprinkling a coating of powdered metallic lead over the form.

2. The method of manufacturing a protective garment for use by X-ray operators comprising dipping a form in a solution of rubber, partially drying the skin of rubber thereby obtained, and while the same is in tacky condition sprinkling a coating of powdered metallic lead over the form, the steps of dipping and sprinkling being repeated until a suitable thickness of material is obtained.

3. The method of constructing a flexible, laminated structure for use in protecting X-ray operators comprising dipping a form in a solution of rubber, sprinkling powdered metallic lead over the form while the rubber is in tacky condition, and repeating the operations until a structure of the desired thickness is obtained.

4. The method of manufacturing a protective garment for use by X-ray operators, comprising the steps of forming a layer of unvulcanized rubber, distributing powdered material having the property of intercepting the X-rays over the layer of rubber, and vulcanizing the structure thus obtained.

5. The method of manufacturing a protective garment for use by X-ray operators, comprising the steps of forming a layer of unvulcanized rubber, distributing powdered material having the property of intercepting the X-rays over the layer of rubber, repeating the operations until the desired thickness of sheet is obtained, and vulcanizing the structure thus obtained.

THOMAS G. RICHARDS.